Nov. 4, 1952     R. REBARCHEK     2,616,393
COW TAIL CLAMP
Filed Sept. 5, 1950
FIG. 1
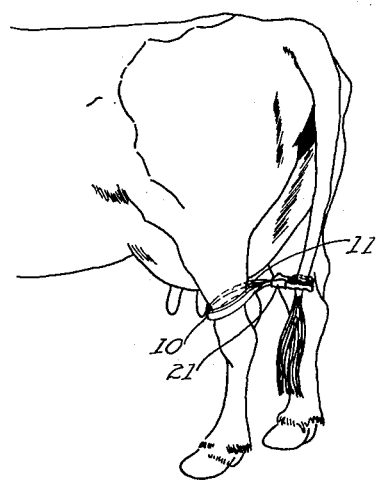
FIG. 3
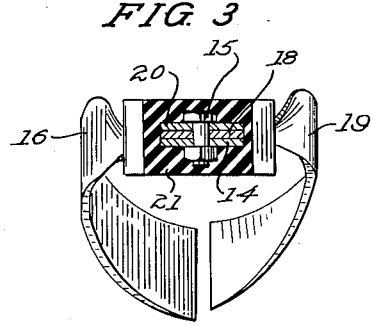
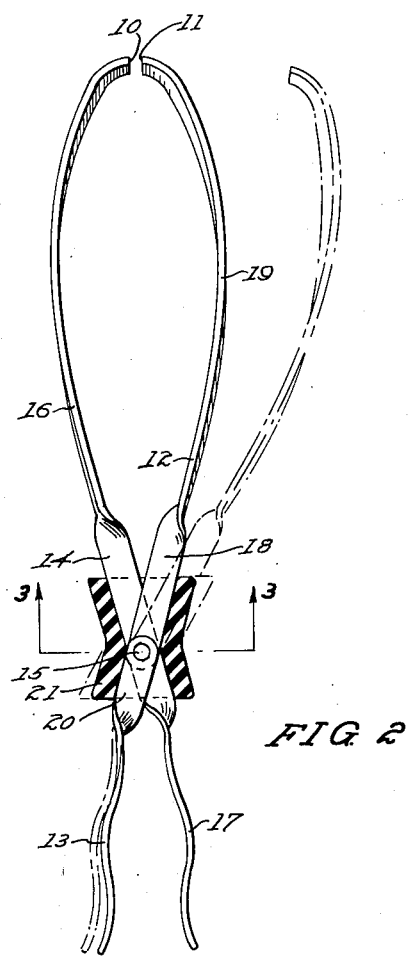
FIG. 2
INVENTOR.
RAYMOND REBARCHEK
BY
McMorrow, Berman & Davidson
ATTORNEYS Patented Nov. 4, 1952

2,616,393

UNITED STATES PATENT OFFICE 2,616,393

COW TAIL CLAMP

Raymond Rebarchek, Palmer, Territory of Alaska

Application September 5, 1950, Serial No. 183,165

1 Claim. (Cl. 119—105)

This invention relates to cow tail clamps for holding a milk cow's tail against movements annoying to a person while milking, and more particularly to a double clamp for simultaneously engaging a cow's tail and rear leg to hold the tail against objectionable switching movements.

It is among the objects of the invention to provide an improved cow tail clamp which will resiliently engage the tail and a rear leg of a milk cow and hold the tail against objectionable switching movements while the cow is being milked, which is easy to apply and remove and will firmly hold the tail without causing any material discomfort to the animal, which is light in weight and so constructed that if subjected to unusual force, it will release the tail and remain attached to the leg so that the clamp will not be swung by the tail to strike the cow or the milker with force, and which is simple and durable in construction, including a minimum number of simple parts, economical to manufacture, and positive and effective in use.

Other objects and advantages will become apparent from a consideration of the following description and the appended claims in conjunction with the accompanying drawing wherein:

Figure 1 is a perspective view of the rear portion of a milk cow showing a tail clamp illustrative of the invention operatively applied to the cow;

Figure 2 is a top plan view on an enlarged scale of the tail clamp illustrated in Figure 1, a portion being broken away and shown in cross section to better illustrate the construction of the clamp; and Figure 3 is a transverse cross sectional view on the line 3—3 of Figure 2.

With continued reference to the drawing, the clamp comprises two arms 10 and 11, the arm 10 being of one piece construction and the arm 11 comprising two pieces 12 and 13 pivotally secured together at their adjoining ends. Both arms are formed of suitable strap metal of elongated, rectangular cross sectional shape of sufficient stiffness to resist the muscular pull which a milk cow is able to exert on its tail.

The arm 10 has an intermediate portion 14 twisted to an angle of approximately 90 degrees to the end portions of the arm and provided with an aperture for the reception of a pivot screw or bolt 15. The portion 16 of arm 10 at one end of the flattened portion 14 is longitudinally bowed and the portion 17 at the other end of the flattened portion 14 is longitudinally curved to provide a bulge intermediate the length of this portion and an outwardly directed end remote from the portion 14.

The part 12 of the arm 11 has at one end a portion 18 which is twisted to an angle of approximately 90 degrees to the remainder of the part 12 and provided near the end of this part with an aperture for the reception of the bolt or screw 15. The remaining portion 19 of the part 12 is longitudinally bowed and is complementary to the longitudinally bowed portion 16 of the arm 10. The bowed portions 16 and 19 are coterminous and have their concave sides facing each other, the curvature and length of these portions being such as to receive therebetween the rear leg of a milk cow, immediately above the knee joint of the leg.

The part 13 of the arm 11 has at one end a portion 20 twisted to an angle of approximately 90 degrees to the remainder of this part and provided at its distal end with an aperture receiving the pivot screw 15. The remaining portion of this part is coterminous with the part 17 of the arm 10 and is provided intermediate its length with an outwardly directed bulge and is outwardly directed at its end remote from the portion 20.

The parts 13 and 17 are substantially coterminous and of a length to receive a cow's tail therebetween and firmly clamp the tail in the bulged portions of the arm parts.

A sleeve 21 of suitable resilient material, such as vulcanized rubber, is placed around the pivotally interconnected portions of the arms 10 and 11 and the pivot screw 15. This sleeve 21 is a rectangular block of resilient material having a rectangular bore extending therethrough and receiving the arm portions 14, 18 and 20 and the pivot screw 15, and is so positioned that the pivot screw 15 is disposed adjacent the midlength location of the sleeve. This resilient sleeve urges the arm portions 16 and 19 together and the arm portions 13 and 17 together so that the clamp will resiliently engage a rear leg and the tail of a cow to which the clamp is applied.

The clamp can easily be removed by first manually applying a separating force to the parts 13 and 17 to release the tail and then manually applying a separating force to the portions 16 and 19 to disengage the clamp from the cow's leg.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

A cow tail clip comprising a pair of arms disposed in substantially coterminous crossed-over relationship, means providing a pivotal connection between said arms intermediate the length of but nearer one end than the other end of said pair of arms, the portions of said arms between said pivotal connection and said one end of said pair of arms being longitudinally curved to provide concavely opposed intermediate portions and convexly opposed end portions and the portions of said arms between said pivotal connections and said other end of said pair of arms being longitudinally bowed and concavely opposed, and a sleeve of resilient material receiving said arms at said pivotal connection therebetween and extending to opposite sides of said pivotal connection, said sleeve being transversely stretched at all times at its opposite ends to resiliently urge the portions of said arms at the opposite sides of said pivotal connection toward each other and one of said arms comprising two pieces disposed substantially in end-to-end relationship and pivotally interconnected by said means providing a pivotal connection between said arms.

RAYMOND REBARCHEK.

REFERENCES CITED

The following references are of record in the file of this patent:

UNITED STATES PATENTS

| Number | Name | Date |
|---|---|---|
| 104,661 | Tanner | June 21, 1870 |
| 104,720 | Farrington | June 28, 1870 |
| 617,247 | Gholson | Jan. 3, 1899 |
| 690,236 | Colwell | Dec. 31, 1901 |
| 1,465,429 | Gasparaitus | Aug. 21, 1923 |
| 1,878,497 | Lehr | Sept. 20, 1932 |
| D. 138,901 | Leon | Sept. 26, 1944 |
| 2,467,487 | Leon | Apr. 19, 1949 |

FOREIGN PATENTS

| Number | Country | Date |
|---|---|---|
| 56,040 | Denmark | Mar. 27, 1939 |